United States Patent
Bogni

(10) Patent No.: US 6,205,699 B1
(45) Date of Patent: *Mar. 27, 2001

(54) FISH HOOK REMOVER

(76) Inventor: Fabio Bogni, 1625 Aaron Way, Kingsport, TN (US) 37664

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,774

(22) Filed: Jun. 30, 1998

(51) Int. Cl.[7] .................................. A01K 97/18

(52) U.S. Cl. ........................ 43/53.5; 606/207; 606/208

(58) Field of Search .................. 43/1, 53.5; 81/318–320, 81/324, 418; 294/26, 99.2; 606/205, 208, 207

(56) References Cited

U.S. PATENT DOCUMENTS

| | | | |
|---|---|---|---|
| D. 275,790 | * 10/1984 | Marlowe | 606/207 |
| 990,994 | * 5/1911 | Lee | 81/418 |
| 1,093,400 | * 4/1914 | Gottfrid | 81/418 |
| 1,510,416 | * 9/1924 | Pietz et al. | 606/205 |
| 1,659,112 | * 2/1928 | Littlejohn | 606/205 |
| 1,913,770 | * 6/1933 | Olenik | 606/207 |
| 1,973,569 | * 9/1934 | Kurtz | 606/208 |
| 2,109,147 | * 2/1938 | Grosso | 81/418 |
| 2,491,763 | 12/1949 | Raisanenen | 43/53.5 |
| 2,887,111 | * 5/1959 | Leyro Diaz | 606/207 |
| 3,101,715 | * 8/1963 | Glassman | 606/207 |
| 3,214,859 | 11/1965 | Watkins | 43/43.16 |
| 3,364,933 | * 1/1968 | Leopold | 606/207 |
| 3,446,211 | * 5/1969 | Markham | 606/207 |
| 3,459,187 | * 8/1969 | Pallotta | 606/208 |
| 3,762,417 | * 10/1973 | Textor | 606/207 |
| 3,778,919 | 12/1973 | Simon | 43/53.5 |
| 3,779,248 | * 12/1973 | Karman | 606/207 |
| 3,786,815 | * 1/1974 | Ericson | 606/207 |
| 3,921,641 | * 11/1975 | Hulka | 606/208 |
| 4,127,957 | 12/1978 | Bourquin | 43/53.5 |
| 4,475,544 | * 10/1984 | Reis | 606/208 |
| 4,574,804 | * 3/1986 | Kurwa | 81/418 |
| 4,620,386 | 11/1986 | Hare | 43/4 |
| 4,655,223 | * 4/1987 | Kim | 606/207 |
| 4,899,482 | * 2/1990 | Gerdes | 43/4 |
| 4,944,739 | * 7/1990 | Torre | 606/207 |
| 5,011,491 | * 4/1991 | Boenko et al. | 606/207 |
| 5,019,092 | * 5/1991 | Klintmalm | 606/207 |
| 5,059,214 | * 10/1991 | Akopov et al. | 606/207 |
| 5,207,702 | * 5/1993 | Pearl | 606/207 |
| 5,219,354 | * 6/1993 | Choudhury et al. | 606/205 |
| 5,250,072 | * 10/1993 | Jain | 606/205 |
| 5,307,586 | 5/1994 | Palmer | 43/53.5 |

(List continued on next page.)

FOREIGN PATENT DOCUMENTS

2599937 * 12/1997 (FR) .................................... 43/53.5

OTHER PUBLICATIONS

Cabela's Fly Fishing 1998 Catalog, p. 39, Forceps, ref. letter U, Forceps, Jan. 1998.*
Cold Spring Anglers 1997 Catalog, p. 21, Tackle, Angler's Forceps, Jan. 1997.*
The Fly Shop 1996 Spring Catalog & Travel Digest, p. 38, Dr. Slick Last a Lifetime Forceps, Jan. 1996.*

Primary Examiner—Darren W. Ark
(74) Attorney, Agent, or Firm—Pitts & Brittian, PC

(57) ABSTRACT

A fish hook remover for removing a fish hook from a fish without damaging dressing affixed to the fish hook. The fish hook remover includes a pair of arms pivotally mounted to one another. Each of the arms defines a first end and a second end. A hook member extends from the first end of each arm at a selected angle and a handle extends from the second end of each arm. The hook members extend from the arms in a manner such that the bend of the fish hook can be gripped between the terminating ends of the hook members without disturbing the dressing.

5 Claims, 2 Drawing Sheets

U.S. PATENT DOCUMENTS

| | | | |
|---|---|---|---|
| 5,475,941 | 12/1995 | Moore | 43/4 |
| 5,557,874 * | 9/1996 | Pietrandrea et al. | 43/4 |
| 5,568,698 | 10/1996 | Harding et al. | 43/53.5 |
| 5,644,865 | 7/1997 | Harrison et al. | 43/53.5 |
| 5,810,878 * | 9/1998 | Burel et al. | 606/205 |
| 6,001,120 * | 12/1999 | Levin | 606/207 |
| 6,077,280 * | 6/2000 | Fossum | 606/205 |

* cited by examiner

FISH HOOK REMOVER

TECHNICAL FIELD

This invention relates to the field of fishing and more specifically to fish hook removers for removing fish hooks without damaging fly dressing, bait, mechanical mechanisms, lures or other items affixed to hooks.

BACKGROUND ART

Fly fishing is a popular sport wherein an artificial fly is used as bait. The artificial fly is typically fabricated with fur, feathers, and the like to resemble an insect the fish are known to consume. Typically, the avid fly fisher ties his own flies. Therefore, it is desirable to have the ability to remove a hook from a caught fish without damaging the fly such that the fly can be used again, particularly when the fly has proven to be effective in luring fish. Further, because it is becoming more common to release fish back into the water, it is desirable to have the ability to remove a fish hook from a caught fish in a manner such that there is little damage to the fish. Moreover, may lakes and streams are designated as "catch and release" areas, where a fish, once caught, must be released. It desirable to prevent injury to fish during hook removal such that the health of fish is not compromised.

Fish book removers are well known in the art of fishing for use to remove a fish hook from a fish which has been caught. Typical of the art are those devices disclosed in the following U.S. Patents:

| U.S. Pat. No. | Inventor(s) | Issue Date |
| --- | --- | --- |
| 2,491,763 | T. Raisanen | Dec. 20, 1949 |
| 3,214,859 | B. Watkins | Nov. 2, 1965 |
| 3,778,919 | J. O. Simon | Dec. 18, 1973 |
| 4,127,957 | T. E. Bourquin | Dec. 5, 1978 |
| 5,307,586 | V. Palmer | May 3, 1994 |
| 5,568,698 | Harding et al. | Oct. 29, 1996 |
| 5,644,865 | Harrison et al. | July 8, 1997 |

The '763, '957 and '865 patents disclose fish hook removers which utilize the weight of the fish to remove a fish hook. Releasing the hook from the fish is complicated by movement by the fish and further, with regard to the '763 and '957 patents, there is no way to protect a dressing on the hook. With respect to the '865 patent, there are means to protect a small dressing but the remover is not configured for larger fly dressings that are utilized in fly fishing.

The '859 patent teaches fishing tackle which includes a release implement to be used with a specially designed hook. The release implement is not an effective tool for use with commonly used hooks. Further, it does not provide a means for preventing damage to dressing tied to the hook.

The '919 and '698 patents teach hook extractor pliers which do not provide means for protecting a dressing secured to a hook.

The '586 patent discloses a fish hook remover which utilizes a plunger and includes no way of protecting a dressing secured to a hook.

Therefore, it is an object of the present invention to provide a fish hook remover which is configured to remove fish hooks from fish without damaging fly dressing, regardless of its size, or any other items affixed to the hook.

It is yet another object of the present invention to provide a fish hook remover which includes a locking mechanism such that the hook remover can be locked once it grips a hook.

DISCLOSURE OF THE INVENTION

Other objects and advantages will be accomplished by the present invention which provides a fish hook remover for removing a fish hook from a fish without damaging dressing affixed to the fish hook. The fish hook remover includes a pair of arms pivotally mounted to one another. Each of the arms defines a first end and a second end. A hook member extends from the first end of each arm and a handle extends from the second end of each arm. The hook member extends from its respective arm at a selected angle. The hook members are configured such that the bend of the fish hook can be gripped via the hook members without disturbing the dressing.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A fish hook remover incorporating various features of the present invention is illustrated generally at 10 in the figures. The fish hook remover 10 is designed to protect fly dressing or any attachment of the like affixed to the hook. Moreover, in the preferred embodiment, the fish hook remover 10 includes a locking device 34 for locking the fish hook remover 10 once a fish hook has been gripped.

Figure 1:
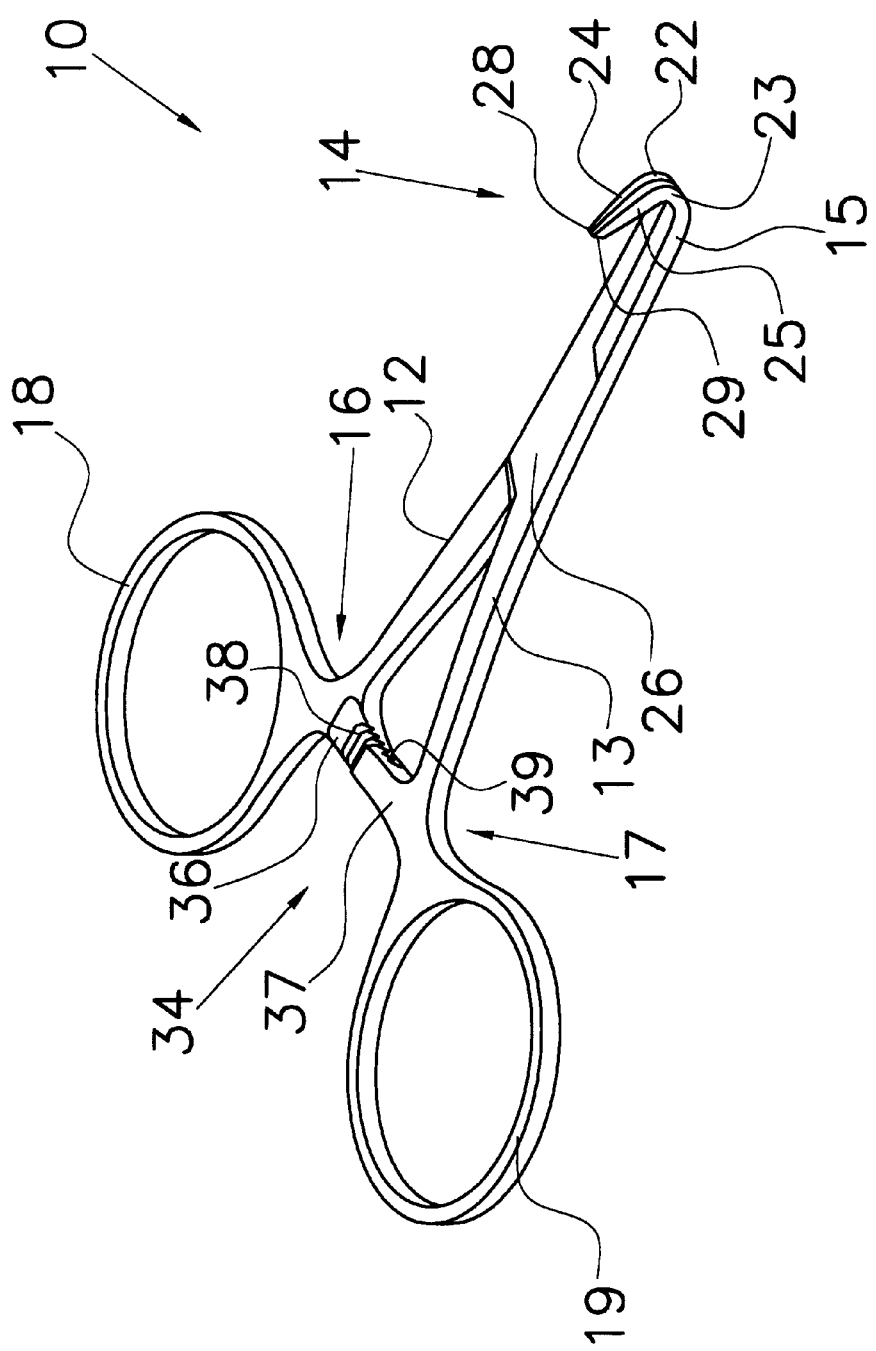
FIG. 1 is a perspective view of the fish hook remover constructed in accordance with several features of the present invention.
Figure 4:
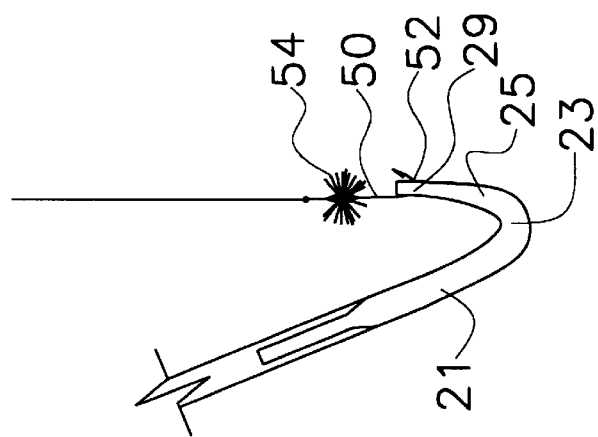
FIG. 4 illustrates partial side view of the fish hook remover gripping a hook with a fly dressing attached thereto.
Figure 3:
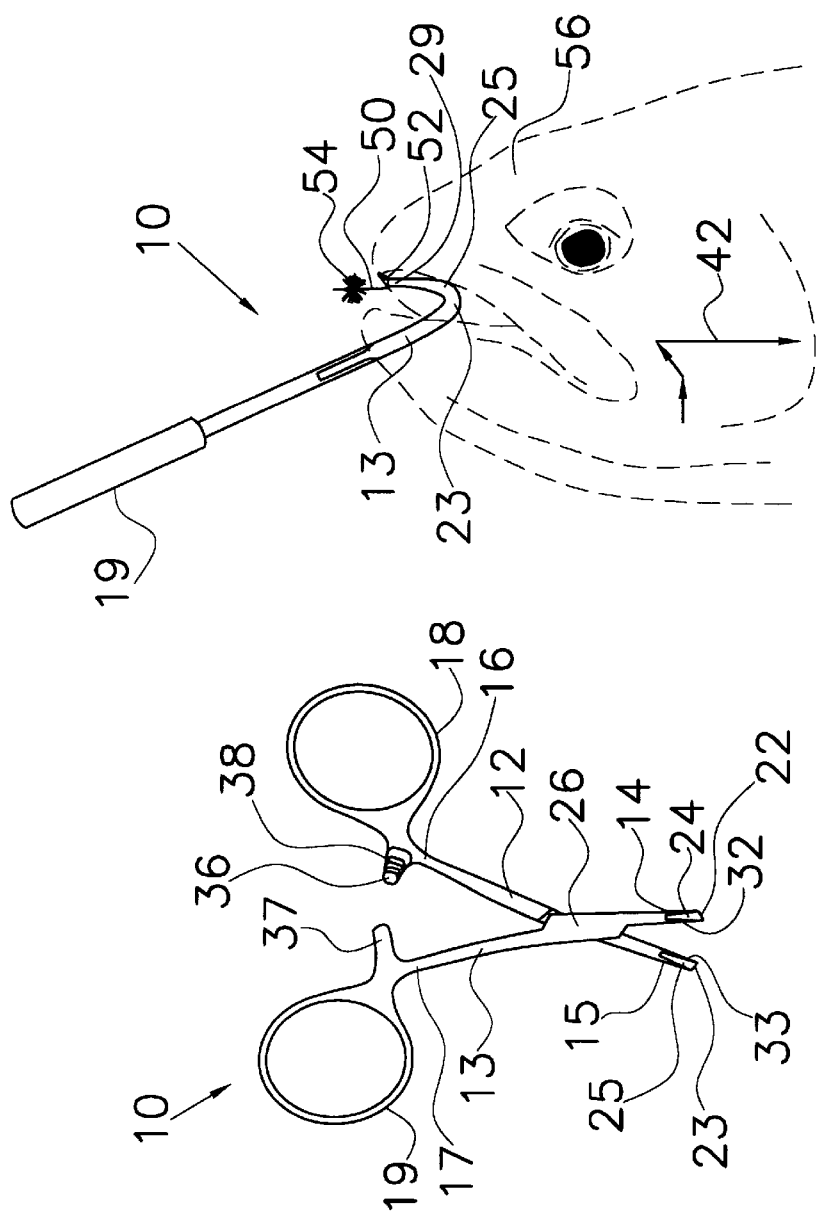
FIG. 3 is a side elevation view of the fish hook remover gripping a hook with a fly dressing attached thereto and which is hooked in a fish.
Figure 2:
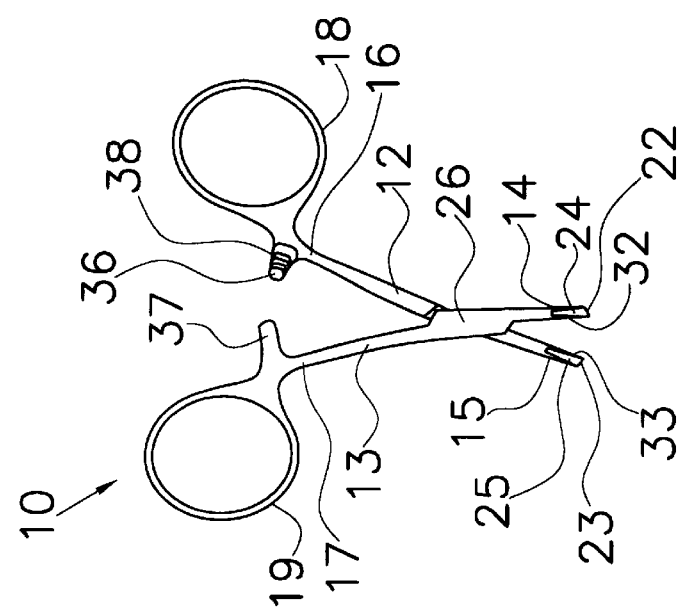
FIG. 2 illustrates a front elevation view of the fish hook remover.

The fish hook remover 10 is generally comprised of a pair of arms 12, 13 pivotally mounted to one another at a pivot point 26, as shown in FIG. 1. A first end 14, 15 of each arm 12, 13 defines a hook member 24, 25 and a second end 16, 17 of each of the arms 12, 13 defines a handle 18, 19. Each of the hook members 24, 25 defines a bend 22, 23 and a terminating end 28, 29 which extends from the first end 14, 15 of the arm 12, 13 at a selected angle, as shown in FIGS. 3 and 4. In the preferred embodiment, the hook members 24, 25 extend at a 45° angle from the arms 12, 13. Each hook member 24, 25 defines an interior face 32, 33 which engage one another when the hook members 24, 25 are pivoted together, most clearly illustrated in FIG. 1.

In the preferred embodiment, the fish hook remover 10 includes a locking device 34 for locking the arms 12, 13 together such that the interior faces 32, 33 of the member hook members 24, 25 are contacting each other in a locked manner. Preferably, the locking device 34 includes two notched extensions 36, 37 one each extending the second end 16, 17 from the arms 12, 13 proximate the handles 18, 19, as shown most clearly in FIG. 1. Each of the notched extensions 36, 37 defines a plurality of notches 38, 39 which cooperate to lock. Specifically, the notches 38 of one notched extension 36 interlock with the notches 39 of the remaining notched extension 37. It will be noted that each notched extension can define only one notch, each of which cooperates to lock the arms together.

When using the fish hook remover 10 to remove a fish hook 50 from a fish 56 while preventing damage to a dressing 54 secured to the fish hook 50, the fish hook 50 is gripped at the bend 52 of the fish hook 50, as illustrated in FIGS. 3 and 4. The hook members 24, 25 are configured such that the fish hook 50 can be gripped at the bend 52 of the fish hook 50 without contacting the fly dressing 54 affixed to the fish hook 50. Specifically, the hook members 24, 25 are positioned below the hook 50 and do not interfere with the dressing.

Specifically, the fish hook remover 10 is utilized in the following manner. The fish hook remover is gripped via the handles 18, 19 and the hook members 24, 25 are positioned in the fish 56 below the hook proximate the bend 52 of the fish hook 50. The hook members 24, 25 are pivoted such that the bend 52 of the hook 50 is positioned between the interior faces 32, 33 of the hook member 24, 25 at the terminating ends 28, 29 of the hook members 24, 25 and the hook members 24, 25 are pivoted such that the bend 52 of the fish hook 50 is gripped between the hook members 24, 25. In this manner the fish hook 50 is gripped without disturbing the dressing 54 affixed to the hook 50.

In the preferred embodiment, the method for use described above includes an additional step of locking the hook members 24, 25 in a closed position once the bend 52 of the fish hook 50 has been gripped with the hook members 24, 25. Specifically, the handles 18, 19 are forced together such that the notches 38 of one notched extension 36 engage the notches 39 of the remaining notched extension 37.

Preferably, once the bend 52 of the fish hook 50 is gripped between the interior faces 32, 33 of the hook members 24, 25, the fish hook remover 10 is manipulated in the directions identified by the arrow 42 illustrated in FIG. 3. Specifically, the fish hook remover 10 is forced in a forward direction thereby dislodging a portion of the fish hook from the fish's tissue. Then, the fish hook remover is raised in an angular direction to stretch the tissue thereby creating an opening through which the fish hook 50 can be pulled and finally the fish hook remover is pulled downward thereby releasing the fish hook 50 from the fish 56.

From the foregoing description, it will be recognized by those skilled in the art that a fish hook remover offering advantages over the prior art has been provided. Specifically, the fish hook remover is designed to protect fly dressing or any attachment of the like, regardless of size, affixed to the hook. Moreover, the fish hook remover includes a locking mechanism for locking the remover once a fish hook has been gripped.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. A fish hook remover for removing a fish hook from a fish, said fish hook remover consisting of:

a pair of arms pivotally mounted to one another, each arm of said pair of arms defining a first end and a second end, said first end being configured to terminate in a hook member, said second end being configured to define a handle, said hook member being disposed in a plane orthogonal to a plane in which said handle is disposed and defining a hook member bend and a terminating end, each said hook member bend and each said terminating end extending back toward said handle from said pair of arms to define a selected angle therebetween in the range of 10°, inclusive, and 90°, exclusive, each of said hook members defining an interior face disposed in a plane orthogonal to said plane in which said handle of each arm of said pair of arms is disposed, each of said interior faces contacting each other when said first ends of said pair of arms are pivoted together, said terminating ends for gripping a fish hook; and a locking device for locking said pair of arms together.

2. The fish hook remover of claim 1 wherein said locking device includes a pair of notched extensions, one of said extensions extending from each of said second ends of said pair of arms, each of said pair of notched extensions defining at least one notch, said at least one notch of one of said pair of notched extensions interlocking with said at least one notch of the remaining of said pair of notched extensions to lock said pair of arms together.

3. A method for removing a fish hook from a fish utilizing a fish hook remover wherein the fish hook has a bend and a dressing secured thereto, said method for removing a fish hook with a fish hook remover comprising the steps of:

gripping the bend of the fish hook between a pair of hook members defined by said fish hook remover, said pair of hook members being defined by a first end of a pair arms which are pivotally mounted to one another, each arm of said pair of arms defining a handle at a second end for gripping by a user, each of said pair of hook members defining a hook member bend disposed in a plane orthogonal to a plane in which said handle of each of said pair of arms is disposed and a terminating end, each of said hook members defining an interior face disposed in a plane orthogonal to said plane in which said handle of each of said pair of arms is disposed, each of said interior faces contacting each other when said first ends of said pair of arms are pivoted together, said terminating ends for gripping the fish hook, said pair of hook members extending from said pair of arms to define a selected angle therebetween in the range of 10°, inclusive, and 90°, exclusive, such that the bend of the fish hook is grippable from below the fish hook such that the dressing is not damaged by said fish hook remover; and, manipulating said fish hook remover to remove the fish hook from the fish.

4. The method for removing a fish hook of claim 3 further including the step of locking said pair of arms together with a locking device after the bend of the fish hook is gripped.

5. The method for removing a fish hook of claim 4 wherein said locking device includes a pair of notched extensions, one of said extensions extending from each of said second ends of said pair of arms, each of said pair of notched extensions defining at least one notch, said at least one notch of one of said pair of notched extensions interlocking with said at least one notch of the remaining of said pair of notched extensions to lock said pair of arms together.

* * * * *